(12) United States Patent
Rimpela et al.

(10) Patent No.: US 7,545,774 B1
(45) Date of Patent: Jun. 9, 2009

(54) METHOD FOR INDICATING POWER CONSUMPTION IN A PACKET SWITCHED COMMUNICATION SYSTEM

(75) Inventors: Riku Rimpela, Tampere (FI); Petri Jarvinen, Tampere (FI); Jarkko Oksala, Tampere (FI); Jari Ruohonen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/383,481

(22) Filed: Aug. 26, 1999

(51) Int. Cl.
*H04W 4/00* (2006.01)

(52) U.S. Cl. .................. 370/331; 370/332; 370/333

(58) Field of Classification Search ............... 370/328, 370/318, 335, 342, 345, 352, 466, 467, 252, 370/331, 332, 333, 347, 442; 450/69, 522
See application file for complete search history.

(56) References Cited

U.S. PATENT DOCUMENTS

| | | | |
|---|---|---|---|
| 5,257,257 A | 10/1993 | Chen et al. ............... 370/18 |
| 5,304,948 A | 4/1994 | Mucke .................... 330/284 |
| 5,307,026 A | 4/1994 | Mucke .................... 330/283 |
| 5,465,399 A | 11/1995 | Oberholtzer et al. | |
| 5,564,080 A | 10/1996 | Eul et al. | |
| 5,566,201 A | 10/1996 | Ostman ................... 375/200 |
| 5,640,395 A | 6/1997 | Hamalainen et al. ....... 370/322 |
| 5,673,266 A * | 9/1997 | Li ......................... 370/465 |
| 5,729,534 A | 3/1998 | Jokinen et al. .............. 370/280 |
| 5,729,541 A | 3/1998 | Hamalainen et al. ........ 370/337 |
| 5,790,534 A | 8/1998 | Kokko et al. ............... 370/335 |
| 5,802,465 A | 9/1998 | Hamalainen et al. ......... 455/403 |
| 5,995,496 A * | 11/1999 | Honkasalo et al. .......... 370/318 |
| 6,031,832 A * | 2/2000 | Turina .................... 370/348 |
| 6,157,616 A * | 12/2000 | Whitehead ................ 370/252 |
| 6,272,123 B1* | 8/2001 | Abe ....................... 370/342 |

(Continued)

FOREIGN PATENT DOCUMENTS

EP  0 615 353 A1  9/1994

(Continued)

OTHER PUBLICATIONS

EN 300 911 V6.3.1 (Mar. 1999), European Standard, "Digital cellular telecommunications system (Phase 2+); Radio subsystem link control (GSM 05.08 version 6.3.1 Release 1997)." European Telecommunications Standards Institute, 1999.

(Continued)

*Primary Examiner*—Eugene Yun
(74) *Attorney, Agent, or Firm*—Perman & Green LLP

(57) ABSTRACT

The invention relates to a method for controlling the function of a mobile station in a packet switched communication network based on a cellular network, which communication network is arranged to transfer information between a base station and at least one wireless communication device by means of a radio channel, wherein to transfer information, a transmission power on a set level is used on the radio channel. Information divided into successive blocks (10, B0-B11) is transmitted from the base station to the mobile station on the radio channel. In the method, the block also contains information (PR) relating to the power level of the transmission. In the method, a block (10, B0-B11) that is transmitted repeatedly and at fixed intervals is transmitted with a fixed transmission power to establish a reference level.

26 Claims, 6 Drawing Sheets

Figure 1:
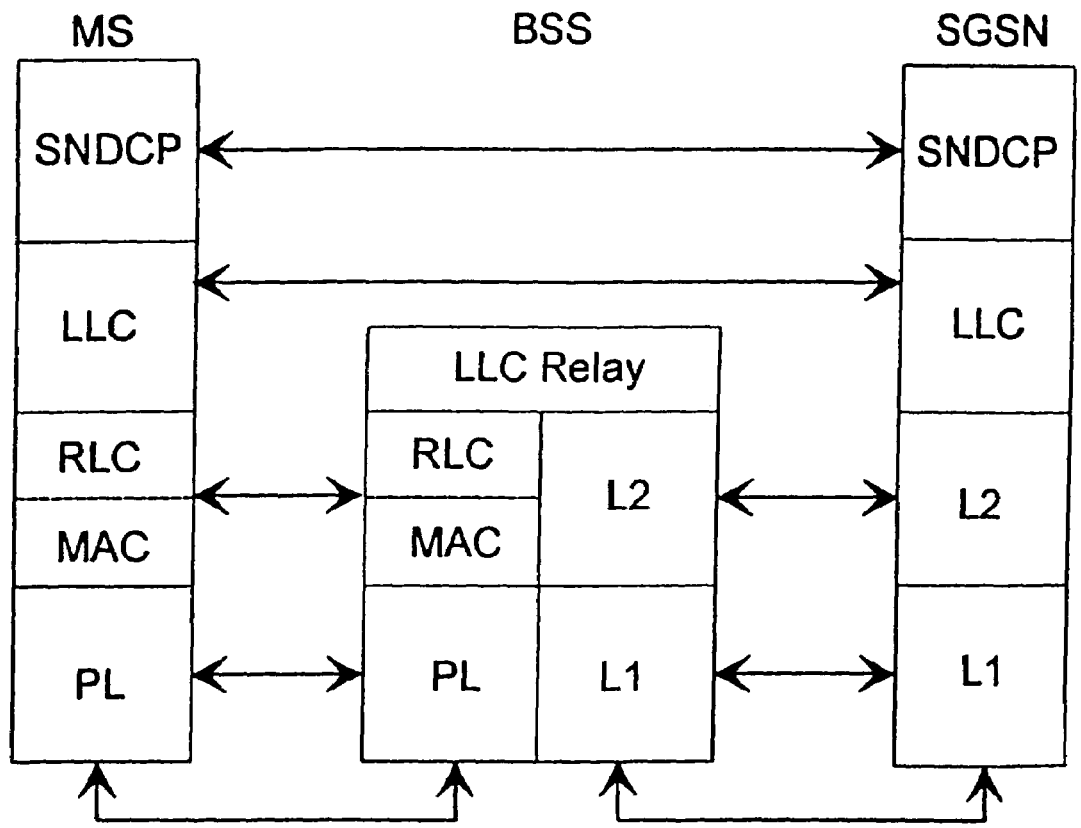

U.S. PATENT DOCUMENTS 6,359,904 B1 * 3/2002 Hamalainen et al. ........ 370/469
6,449,484 B1 * 9/2002 Grubeck et al. ............. 455/450

FOREIGN PATENT DOCUMENTS

| EP | 0 848 515 A2 | 6/1998 |
| FI | 101760 | 8/1998 |
| GB | 0813314 A2 * | 12/1997 |
| WO | WO 92/21196 | 11/1992 |
| WO | WO 96/03813 | 2/1996 |
| WO | 9633586 A1 | 10/1996 |
| WO | 97/26716 A2 | 7/1997 |
| WO | WO 97/26716 | 7/1997 |

OTHER PUBLICATIONS

TS 100 911 V6.2.0 (Jul. 1998), Technical Specification, "Digital cellular telecommunications system (Phase 2+); Radio subsystem link control (GSM 05.08 version 6.2.0 Release 1997)." European Telecommunications Standards Institute, 1998.

European Search Report, Application No. 07118373.5—2412, Dated Dec. 18, 2007.

Adachi, F. et al., Wideban Multi-rate DS-CDMA for Next Generation Mobile Communications Systems, Wireless Communications Conference, Aug. 11, 1997, pp. 57-62.

Larsson, P. et al., Performance Evaluation of Different Frequency Reuse Patterns and Channel Coding Schemes in GPRS, Vehicular Technology Conference, May 18, 1998, pp. 139-143.

Raitola, M. et al., Neighbour Cell Monitoring in a 3rd Generation TDMA Systems, Vehicular Technology Conference, May 18, 1998, pp. 1405-1408.

Goldsmith, Andrea J. et al., "Variable-Rate Variable-Power MQAM for Fading Channels," IEEE Transactions on Communications, vol. 45, No. 10, Oct. 1997.

* cited by examiner

RLC data Block
Downlink

| 1 | 2 | 3 | 4 | 5 | 6 | 7 | 8 | |
|---|---|---|---|---|---|---|---|---|
| Payload Type | | RRBP | | S/P | USF | | | MAC header |
| PR | | TFI | | | | | FBI | Octet 1 |
| BSN | | | | | | | E | Octet 2 |
| Length indicator | | | | | | M | E | Octet 3 (optional) |
| ⋮ | | | | | | | | ⋮ |
| Length indicator | | | | | | M | E | Octet M (optional) |
| | | | | | | | | Octet M+1 |
| RLC data | | | | | | | | |
| | | | | | | | | Octet N-1 |
| | | | | | | | | Octet N |
| spare | | | | spare | | | | (If present) |

Fig. 3

METHOD FOR INDICATING POWER CONSUMPTION IN A PACKET SWITCHED COMMUNICATION SYSTEM

The present invention relates to a method according to the preamble of the appended claim 1. The invention relates to a communication system according to the preamble of the appended claim 8. The invention relates to a wireless communication device according to the preamble of the appended claim 9. The invention relates to a method according to the preamble of the appended claim 10. The invention relates to a communication system according to the preamble of the appended claim 11. The invention relates to a wireless communication device according to the preamble of the appended claim 12.

The term "wireless communication system" refers generally to any communication system which enables wireless communication between a wireless communication device (MS, Mobile Station) and the fixed parts of the system, when the user of the wireless communication device is moving within the service area of the system. A typical wireless communication system is a public land mobile network PLMN. The majority of wireless communication systems in use at the time of filing this application belong to so-called second generation mobile communication systems, of which the widely known circuit switched GSM mobile communication system (Global System for Mobile Telecommunications) can be mentioned as an example. The present invention is especially well applicable to the mobile communication systems currently under development. In this specification, a GPRS system (General Packet Radio Service) which is being standardized at present, will be used as an example of such a mobile communication system. It is obvious that the invention can also be applied in other mobile communication systems (UMTS, 3 G).

As is well known, in modern public land mobile networks (PLMN) based on a cellular network, the system is composed of several mobile stations (MS) using the system, such as mobile phones, and a fixed base station subsystem (BSS). This base station subsystem typically comprises several base transceiver stations (BTS) which are distributed within a geographical area, each base station serving a cell which comprises at least a part of this geographical area.

For example in the GSM system, the data transmission between communication devices such as a mobile station and a base station via one logical radio channel, takes place at the rate of 9.6 kbit/s. The packet switched GSM GPRS system (General Packet Radio Service), based on the GSM system, enhances data transmission, because the same logical radio channel can be used by several different mobile subscribers. For example between the mobile station and the base station, data transmission occurs only when necessary, and the logical radio channel is not reserved solely for communication between one mobile station and one base station. In the system, a so-called virtual data transmission connection prevails between the mobile station and the GPRS system.

The general packet radio service GPRS is a new service under development for the GSM mobile communication system. The functional environment of the GPRS system comprises one or more subnetwork service areas connected to form a GPRS backbone network. The subnetwork comprises several support nodes (SN) of which serving GPRS support nodes (SGSN) will be used as an example in this specification. The serving GPRS support nodes are connected to the mobile communication network (typically to the base station via an interface unit) in such a way that they can provide packet switching services for wireless communication devices via base stations (cells). The mobile communication network provides packet switched data transmission between the support node and the wireless communication device. Different subnetworks, in turn, are connected to an external data network, for example to a public switched data network (PSDN), via GPRS gateway support nodes (GGSN). Thus, the GPRS service enables packet format data transmission between a wireless communication device and an external data network, wherein certain parts of the mobile network form an access network.

In order to use the GPRS services, the wireless communication device first performs a GPRS attach, with which the wireless communication device indicates to the network that it is ready for packet data transmission. The GPRS attach forms a logical link between the wireless communication device and the support node SGSN and thereby allows short message services (SMS) via the GPRS network, paging services via the support node and notifying the wireless communication device of incoming packet data. Furthermore, in connection with the GPRS attach of the wireless communication device, the support node provides a mobility management function (MM) and performs user authentication. To transmit and receive information, a packet data protocol (PDP) activation is performed, with which a packet data address to be used in the packet data connection is defined for the wireless communication device, wherein the address of the wireless communication device is known in the gateway support node. Thus, in the GPRS attach a data transmission connection is established to the wireless communication device, to the support node and to the gateway support node, and a protocol (e.g. X.25 or IP), a connection address (e.g. X.121 address), a quality of service level and a network service access point identifier (NSAPI) is defined for this connection. The wireless communication device activates the packet data connection with an activate PDP context request, in which the wireless communication device communicates the temporary logical link identity (TLLI), the type of the packet data connection, the address, the required quality of service level, the network service access point identifier and possibly also the access point name (APN).

Firstly, the interference-free function of a communication network, and secondly, the efficient utilization of the resources available are possible only if, for example in the transmission from base stations, the power levels used are as optimal as possible. Further requirements are set by the extending operating, standby and talk times of mobile stations between the loadings of the power supply, especially for the power consumption of mobile stations to control their own operation. However, the transition to the use of new generation communication services, especially packet switched communication networks, requires that the services given to the user are not impaired when compared with conventional circuit switched communication networks. For example in packet switched communication networks, however, it is quite problematic to try to attain this objective because of several reasons described hereinbelow.

The basic idea of the GPRS system is to use packet switched resource allocation, wherein resources, e.g. a logical radio channel for the communication, are allocated when it is necessary to transmit and receive information. Thus, the use of the network and resources available is optimized and used as effectively as possible when compared e.g. to the GSM technique. The GPRS is designed to support applications utilizing intermittent data transmissions which occasionally comprise large quantities of data. In the GPRS system, channel allocation is performed very rapidly, typically within 0.5 to 1.0 seconds, and channel allocation is quite flexible; for example for each wireless communication device, it is possible to allocate from 1 to 8 time periods i.e. time slots on a channel within the scope of one TDMA frame, in other words from 1 to 8 logical channels at the same time. The same resources can be divided between several active wireless communication devices, and an uplink data transmission (i.e. data transmission from the mobile station to the base station) and an downlink data transmission (i.e. data transmission from the base station to the mobile station) can be allocated separately for the users. The GPRS system also supports conventionally used data transfer protocols, such as the TCP/IP protocol. In each time slot, a data packet is transmitted in a radio frequency burst with a limited duration, composed of a series of modulated bits. The time slots are primarily used as control channels and communication channels. The communication channels are used to transmit speech and data, and the control channels are used for signalling between a base transceiver station BTS and wireless communication devices MS.

The most significant difference between the GSM system and the GPRS system is the packet based data transmission, wherein radio channels are not reserved for a single wireless communication device. In the GPRS system based on a cellular system, resources include radio channels used for data transmission (PDCH, Packet Data Channels). Signalling used for controlling in general, is conducted in a PCCCH control channel (Packet Common Control Channel), allocated to be used for that purpose.

More specifically, the PDCH channels are divided into logical radio channels by means of a frame structure (Multiframe), which comprises 52 TDMA frames transmitted repeatedly and divided further into 12 radio blocks each divided into 4 frames, and 4 idle frames. According to FIG. 4, the blocks are sequentially referred to as blocks B0-B11. Furthermore, in FIG. 4, the idle frames are marked with a reference X. In downlink data transmission, these can be used for signalling, and in the uplink data transmission, the USF value refers to these time slots, wherein for example a mobile station can transmit information (Access Burst). The term TDMA (Time Division Multiple Access) refers to dividing a physical radio channel into logical radio channels within a time domain, which is known as such. In more detail, the blocks are also divided into following parts: MAC header (Media Access Control), RLC data block (Radio Link Control) or RLC/MAC control block, and BCS block (Block Check Sequence). Several RLC data blocks of the RLC radio link layer form an LLC level (Logical Link Control) of the LLC data link layer. The RLC data block contains an RLC header and RLC data. The MAC header will be described in more detail hereinbelow, and it comprises for example a USF field (Uplink State Flag).

The terms LLC, RLC and MAC also refer to the protocol layers of a protocol structure according to an OSI model (Open Structured Interface) used in communication. The functions of the known RLC/MAC (Radio Link Control/Media Access Control) layer are necessary between the LLC layer and the wireless communication device. The interface between the LLC layer and the RLC layer is called an RR interface. Above the LLC layer, there are known GPRS mobility management functions, SNDCP functions and short message service functions. The RLC/MAC (Media Access Control) layer is specified in more detail in the GSM standard specification. Correspondingly, the SNDCP layer and the LLC layer are specified in more detail in the GSM standard specifications. The MAC is used to allot radio channels for wireless communication devices and to allocate a physical radio channel to a wireless communication device for transmission and reception according to the need. The RLC block is responsible e.g. for requesting resource allocation for the packets to be transmitted towards the mobile communication network.

For multiple access, a TFI identifier (Temporary Flow Identifier) is used in the header information of the data transferred in downlink data transmission. Each RLC header comprises a TFI identifier, and the same identifier is used to indicate the blocks belonging to the mobile station intended for the communication. According to the GPRS system, all wireless communication devices waiting for data to be transmitted to them from a channel allocated jointly for them, also receive all the blocks of the frame structure, including RLC blocks, decode the information received, along with the TFI identifier, and first after that filter out the blocks with a wrong TFI identifier. For the function of the entire GPRS system, it is extremely important that the data of the control blocks in downlink data transmission is received as accurately as possible. Otherwise the capacity of the system is unnecessarily used to re-transmit data, and inaccurate reception of the control blocks causes problems in resource management. According to prior art, the TFI identifier can have 128 different values, in other words 128 different mobile stations can listen to a radio channel when they are in a transfer state and waiting for information addressed to them.

In uplink data transmission, multiple access is implemented in such a way that the wireless communication device needs a permission for data transmission using a determined radio block. This permission can be given in a variety of ways, for example by monitoring the corresponding blocks which are, however, used in downlink data transmission, in order to activate data transmission as soon as the permission arrives, or in the beginning of the data transmission connection, the blocks intended for this mobile station are indicated to the mobile station. In the GPRS system, resources can also be allocated for one wireless communication device (fixed allocation), but this fixed resource can also be allocated for data transmission intended to another mobile station, without indicating this to the initial mobile station.

However, in the above-described situation of prior art, the problem is that the communication device unnecessarily consumes a great deal of power in a situation where it does not use power primarily for data transmission but monitors the downlink data transmission. This monitoring is performed bearing in mind that the information to be transmitted comprises blocks belonging to the data intended for the mobile station in question.

In the channel allocation in the beginning of the data transmission, the mobile station is notified by means of a bit map of the determined blocks during which transmission and reception is possible. Thus, the data transmission entails a data transmission connection between a base station and a determined wireless communication device. The wireless communication device requests the base station for resources for example on a PRACH channel (Packet Random Access Channel) by means of a PCR message (Packet Channel Request), and the resources allocated for the mobile station for uplink data transmission are indicated in a PIA message (Packet Immediate Assignment). The PIA message contains a list of the PDCH channels available and the value of the USF field to be used. An individual TFI identifier is determined and attached to each RLC data block used in data transmission. When using a SDCCH coding scheme, the USF field contains 3 bits in the beginning of each radio block used in downlink data transmission. Therefore, when multiplexing uplink data transmission, it is possible to use 8 different USF field values. On a PCCCH channel (Packet Common Control Channel), one USF value can be used to indicate the PRACH channel used in uplink data transmission (USF=FREE), and other USF values can be used to allocate uplink data transmission for 7 different mobile stations. The USF value points to the next uplink data transmission block, and the USF value is being constantly transmitted in connection with downlink data transmission.

In digital TDMA systems, such as the GSM system, the mobile station measures constantly the strength of the signals on the radio channels of the serving base station and the adjacent base stations. The mobile station measures constantly the strength of the signals and transmits a measurement report on the signal level of the radio channels to the serving base station. This measurement report is transmitted by the mobile station via a logical control channel SACCH (Slow Associated Control Channel). According to the GSM standard, the measurement report includes for example information on the signal level of the serving base station and of as many as six adjacent base stations. The network operator makes a decision on a channel change and the cell selection, for instance on the basis of the measurement report, but measurements on signal strength are also made in the base station. Also when the serving base station detects that the signal strength of the radio channel used for data transmission is below a set threshold value, it is possible to change the channel and select a new cell, in which procedure the measurement report transmitted by the mobile station is utilized. Communication is transferred for example onto the base station radio channel of that new cell which has the highest signal level. Thus, in connection with the channel change, data transmission is transferred to take place between the mobile station and this new base station on a new radio channel. By means of the measurement report transmitted by the mobile station, it is also possible to detect in the serving base station whether the signal level of any of the adjacent cells is higher than the signal level of the serving base station, wherein a decision to select a new cell can also be made solely on the basis of this information. The decisions for selecting a new cell are also necessary for directing a load caused by data transmission to another base station.

Typically, the measurements made by the base station are related to power control used in uplink data transmission, to the planning of the use of frequencies, and to resource prioritisation. The measurements conducted by the mobile station are typically related to power control used in downlink data transmission, to the selection of the cell or to cell change (handover). Power control denotes, for example, the transmission power used by the mobile station to transmit a radio signal to the base station.

In the GPRS system, mobile stations have to be constantly ready for packet-format data transmission of typically very short duration. Thus, the mobile station has to move quickly from a so-called idle mode to a so-called transfer mode. According to prior art, taking measurements and transmitting a measurement report typically takes approximately 1 second. The base station typically calculates an average of several measurements, and it takes approximately 2 seconds. Furthermore, it takes approximately 0.5 seconds to transmit the measurement results to the mobile station, wherein the cumulative delay is several seconds. In data transmission in the GPRS system (TBF, Temporary Block Flow), the transmission of IP packets (Internet Protocol), i.e. packets containing address data and information, typically lasts from ca 8 to 40 frames. According to prior art, reports are transmitted in intervals of 104 TDMA frames (Report Period), which thus takes approximately 480 ms. This has the result that already when starting the data transmission, the used power level has to be as advantageous as possible with respect to successful data transmission and desired quality of service (QoS).

The problem is, however, that the mobile stations in the GPRS system should not use too high power levels because of the restricted capacity of the batteries used in them. The use of too high power levels results in a shortened service life of the battery as well as in shortened talk times. In connection with modern GSM phones known from the GSM system, long standby times are known that last for several days in between loadings.

For the purpose of selecting a cell, the mobile station uses an average value to maintain data on the received signal level of the physical radio channel used. The signal level is measured in dBm units. The average is based on at least five samples taken from the radio channel during 3 to 5 seconds. In connection with the multiple access implemented by the GPRS system, this poses the problem that the mobile station has to examine first, in the way described above, whether the data block used in the downlink data transmission belongs to it, and only after that, the measurement data can be included in the average value. Because the mobile station first has to interpret the data block correctly, this has the effect that the measurement results are better than the actual situation. The mobile station conducts measurements constantly, for example on the PDCH channel or BCCH channel it uses.

When two different base stations use one or more radio channels operating in the same frequency range for data transmission, the geographical distance between these base stations and between the cells at the same time has to be sufficient so that they would not interfere with each other. The signal level of the base station far away from the base station is typically so low, due to fading and the effect of the environment, that data transmission is not possible. In order for the mobile communication network to serve its mobile subscribers effectively, it is possible to place one or more base stations serving a new cell between the above-presented base stations that use the same radio channels, to separate them, which base station uses different radio channels than the above-presented base stations. In analog FDMA systems (Frequency Division Multiple Access) of prior art, such as AMPS (Advanced Mobile Phone Service) and NMT (Nordic Mobile Telephone), a method of the above-described kind is used, wherein a separate frequency band is allocated for each radio channel, i.e. a so-called physical radio channel is produced. In TDMA systems (Time Division Multiple Access), such as D-AMPS, GSM and JDC/PDC, a method of the above-described kind is used for dividing the physical radio channel into logical radio channels in the time level. For example in the digital GSM system, the physical radio channel is divided into eight logical radio channels.

Due to the ever increasing use of mobile stations, the resources available have to be efficiently utilized. In this context, it is important to control the power used, especially the power used for transmission. To make the division of different physical radio channel frequencies among different cells (frequency reuse) as efficient as possible, the interference caused by the same radio channel on the corresponding radio channel of another cell has to be as small as possible, which can be described with a C/I parameter (Carrier/interference Ratio). When the use of the GPRS system based on the GSM system increases in highly optimized GSM networks, the power control becomes even more important in order that the re-devision of the frequencies among different cells as a result of increased interference could be avoided. In this context, it is obvious that lower power levels reduce interference, and at the same time, the size of the cell can be reduced.

Consequently, the capacity available can be increased to serve the mobile subscribers. In practice, interference minimization refers to the use of power levels as low as possible in all situations. For each cell, a desired QoS is defined, and on the basis of the measurements, the required power level is defined in order to maintain the quality.

Power control can be successfully applied, especially when using frequency hopping in the system. In the GPRS system, power control is used in downlink data transmission only on PDCH channels which are not used as PBCCH and PCCCH channels and which are not allotted to a BCCH channel frequency. Frequency hopping enables autonomous power control of adjacent cells, and thus the power used can be set as low as possible. If a single frequency is used, it is not possible to lower the value of the powers used in the area of the cell for data transmission without simultaneously lowering the power levels used by the adjacent cells. This results from the fact that in connection with data transmission of a mobile station, a certain minimum value has to be ensured for the C/I parameter.

In the GPRS system, the fact that all data blocks may in some situations contain information addressed to two different mobile stations, sets demands for the power control used in downlink data transmission of the base station. In addition to the actual data block addressed to the first mobile station, this information also contains USF information intended for the second mobile station. Thus, a need occurs to change the value of the transmission power for the second mobile station in the middle of on-going downlink data transmission (TBF). This has caused problems, because the change in the power levels has been unpredictable. Furthermore, there may be a group of other mobile stations waiting for data blocks of the downlink data transmission addressed to them in particular, thereby unnecessarily consuming the capacity of their power source. Furthermore, mobile stations do not have data available whether a change in the level of the received signal is caused by a change in the environment of the moving mobile station or a change in the transmission power caused by the base station.

In the GPRS network, the basic idea of the multiple access is that it is possible for the mobile station to receive all the information transmitted by the serving base station. From the received RLC blocks, the mobile station decodes the data allotted to it. In known mobile stations, one known technique that can be mentioned is the so-called AGC method (Adaptive Gain Control), for the purpose of monitoring the effects of the environment on the wireless communication. These effects include, for example, those caused by reflections, drop-outs and fadings. In the predictive AGC method, in order to perform control, both slow changes, e.g. changes due to the motion of the mobile station, and rapid changes caused e.g. by drop-outs caused by the environment are monitored. In the predictive AGC method, the aim is to set the level of the received signal for input in the receiver of the mobile station on a reference level corresponding to the suitable reference level of the amplifier used in the mobile station. Furthermore, it is supposed that the level of the received signal does not change too much during the transmission, and the change is primarily due to signal drop-out. Because of this, the dynamic range of the receiver is typically defined to extend approximately 15 dB above the reference level and 20 dB below the reference level. In this context, one has to bear in mind that in the GPRS system, the difference between the frames (burst) in the strength of the received signal can be 30 dB, depending on which mobile station the data transmission is addressed to. This takes place especially when ongoing downlink data transmission is interrupted due to data transmission of higher priority which is addressed to another mobile station. Other alternatives include, for example, transmitting different control messages, such as an acknowledgement message to another mobile station for uplink data transmission.

Another factor affecting the reception is that, according to valid GPRS system specifications, one RLC block whose location is not defined in detail has to be transmitted in a multiframe structure to the mobile stations which are in a packet transfer mode. In particular, this causes the problem that the mobile station does not know which block is intended for it. Thus, power control for setting an amplification for the reference level is difficult because of the missing data.

When using the AGC method and power control for downlink data transmission while the data transmission is constantly interrupted, it is thus not possible to receive all the data blocks in an error-free manner in the mobile station. As a result, some of the data blocks addressed for the mobile station are lost.

When changing to a state in which packets are transferred in data transmission, the communication network has no means to select a suitable transmission power. The transmission powers should be as low as possible to avoid co-channel interference and to optimize power consumption. According to prior art, power control is conducted in such a way that data transmission takes place with the highest transmission power allowed in the cell in question, after which the power is rapidly reduced with the help of the data given in measurement reports received. Changes in the transmission power entail, however, a maximum change allowed in the transmission power, which is for example 2 dB. This is used to prevent unnecessary oscillation of the transmission power which, in turn, reduces co-channel and adjacent channel interference. In the circuit switched GSM system, the transmission power control takes place in steps of 2 dB at intervals of 60 ms, when the control range is 30 dB. Also in the GPRS system, the step can be 2 dB. It should be mentioned in this context that as the length of the packets to be transferred can vary from one block to hundreds of blocks, the time used for data transfer is 18.46 ms at the shortest and over a second at the longest. However, the measurement results are processed in the way described above, and the problems caused by delays are also presented above.

The purpose of the present invention is to present a considerable improvement in the prior art to ensure a reliable reception for a communication network and mobile stations. The invention is based on the idea that mobile stations are informed of changes in power levels caused by the communication network. The invention is also based on the idea that information intended for a mobile station is indicated to it in advance. Furthermore, the invention is based on the idea that an information block to be received also comprises an information block transmitted at a fixed power level and at a fixed moment.

The method according to the invention is characterized in what will be presented in the characterizing part of the appended claim 1. The communication system according to the invention is characterized in what will be presented in the characterizing part of the appended claim 8. The wireless communication device according to the invention is characterized in what will be presented in the characterizing part of the appended claim 9. The method according to the invention is also characterized in what will be presented in the characterizing part of the appended claim 10. The communication system according to the invention is characterized in what will be presented in the characterizing part of the appended claim 11. The wireless station according to the invention is primarily characterized in what will be presented in the characterizing part of the appended claim 12.

With the present invention, considerable advantages are achieved when compared with methods and systems of prior art.

Furthermore, a particular advantage of the invention is that the predictive AGC method can be applied more reliably and more effectively. This is especially a result of the fact that the mobile station knows the power level used in the accomplished data transmission, and furthermore, the power level used in the data transmission is indicated to the mobile station, for example by means of an offset value. By means of the invention, data transmission becomes more predictable, which also enables the use of architectural structures of receivers known in connection with the circuit switched GSM system. Conventionally, when designing receivers operating in the GSM system, it has been possible to assume that the signal source, i.e. the base station is unchanging. Thus, the only function has been to predict the effects of the environment on the signal (fading, frequency shift, delay spread) in order to receive the signal. According to the invention, when indicating the power level used by the base station, in the data transmission of the GPRS system it is now possible to distinguish in the mobile station whether a change in the received signal was caused by the base station or by changes in the environment.

As is well known, according to the current GPRS specifications, in the data transmission of the frame structure (multiframe) at least one block has to be transmitted with a sufficient transmission power to each mobile station in a transfer mode, which, however, complicates the operation of the communication network. The purpose is to tune the different parameters (timing, frequency, amplification) of the mobile station by means of a reference. The use of this reference transmission is not, however, possible because the mobile stations do not know the moment and location of transmission and the transmission power used. According to a preferred embodiment of the invention, this is arranged in such a way that in the frame structure composed of blocks in the communication, one block, advantageously the first radio block (B0, FIG. 4), is transmitted with the same power than the PBCCH channel or BCCH channel, if the PBCCH channel is not available. In this way, according to the invention, it is possible to find a reference level in which listening has to be conducted in order to secure reliable reception.

When the PDCH channel comprises 12 blocks, a block can be transmitted to a maximum of 96 mobile stations during the frame (single slot). However, this would mean that approxomately 92% of the power used by the mobile station for the reception is wasted. In practice, however, the value (96) is considerably smaller still, because blocks and capacity are also used for other data transmission, such as signalling, and because most of the GPRS mobile stations support multislot data transmission. The result is, as presented above, that the mobile stations unnecessarily consume the capacity of their power source in order to receive a few blocks during a frame.

Figure 2:
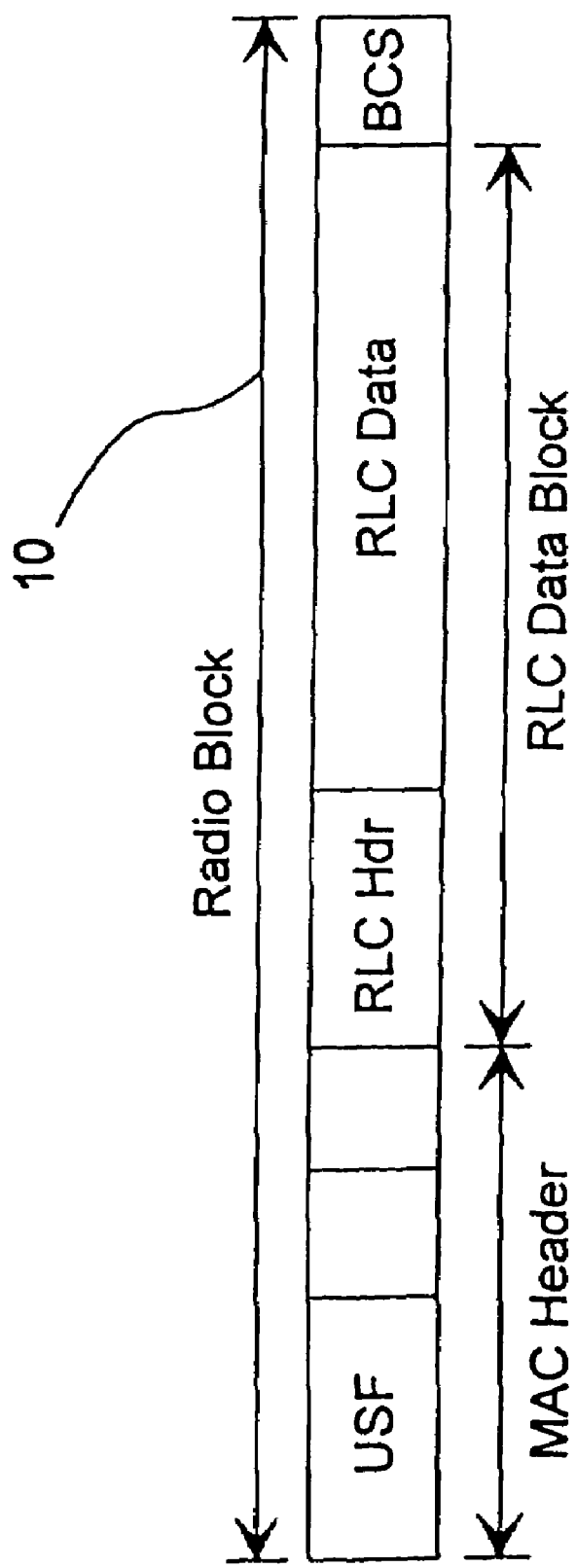
Figure 4:
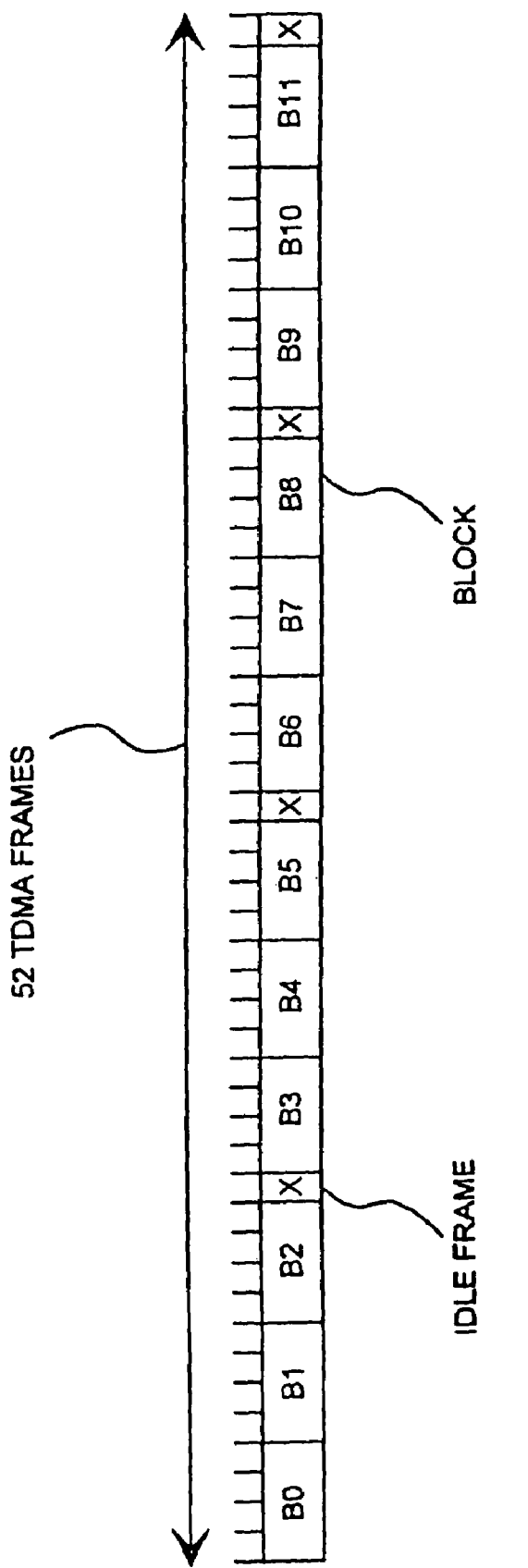
Figure 5:
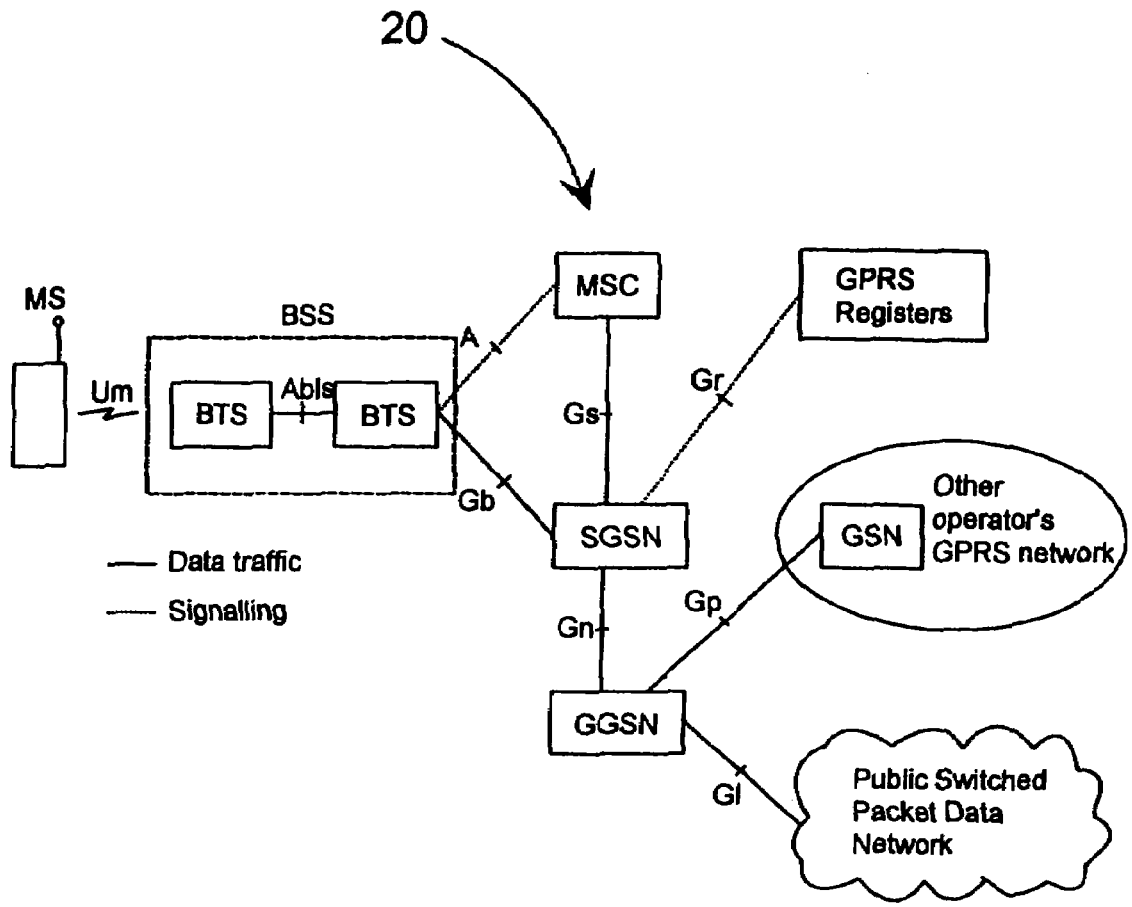
Figure 6A:
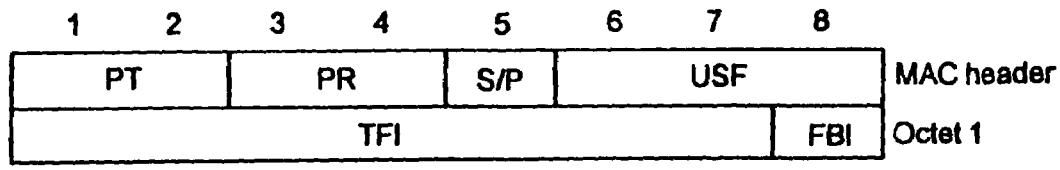
Figure 6B:
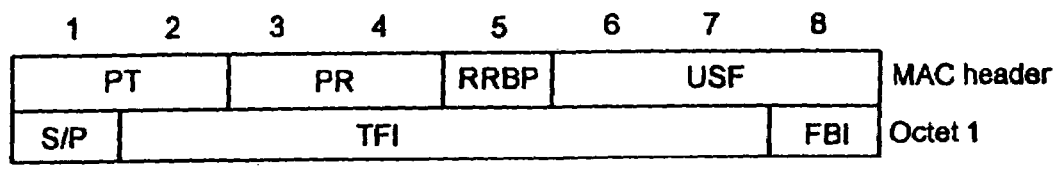
Figure 6C:
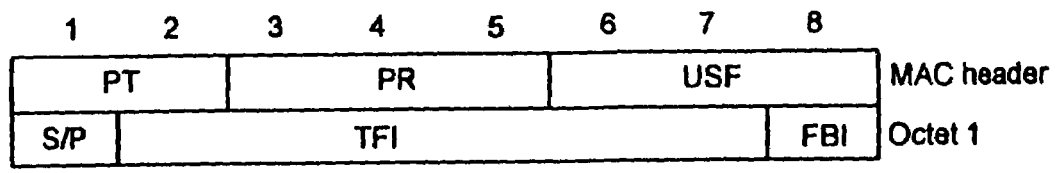

In the following, the invention will be described in more detail with reference to the appended figures, in which:

FIG. 1 shows a protocol stack of prior art, especially a protocol stack of the GPRS system, FIG. 2 shows the structure of a block according to prior art, especially the structure of a radio block of the GPRS system, FIG. 3 shows the structure of a block according to the invention, especially the structure of an RLC/MAC block used in downlink data transmission in the GPRS system, FIG. 4 shows a frame structure of prior art, especially the frame structure of the GPRS system, FIG. 5 shows a preferred system in which the invention can be applied, and FIGS. 6a-6c show the structures of blocks according to other preferred embodiments of the invention, especially the structure of RLC/MAC blocks used in downlink data transmission in the GPRS system.

The protocol stack of the GPRS system shown in FIG. 1 and the structure of the radio block of the GPRS system are specified in more detail in the GSM standard specification.

FIG. 5 shows communication network connections in a packet switched GPRS service. The main element of the infrastructure of the network for the GPRS services is a GPRS support node, GSN. It is a mobility router for implementing the coupling and co-operation between different data networks, for example to a public switched packet data network PSPDN via a connection Gi, or to a GPRS network of another operator via a connection Gp, mobility management with GPRS registers via a connection Gr, and transmission of data packets to wireless communication devices MS, irrespective of their location. Physically, it is possible to integrate the GPRS support node GSN with a mobile services switching center MSC, or it can constitute a separate network element based on the architecture of data network routers. The user data is transferred directly between the support node GSN and a base station system BSS composed of base transceiver stations BTS and base station controllers BSC, via a connection Gb, but between the support node GSN and the mobile services switching center MSC there is a signalling connection Gs. In FIG. 5, solid lines between the blocks represent data communication (i.e. transmission of speech or data in digital format), whereas broken lines represent signalling. Physically, data can be transferred transparently via the mobile services switching center MSC. The radio interface between the wireless communication device MS and a fixed network runs via the base transceiver station BTS and is indicated with the reference Um. References Abis and A denote an interface between the base station BTS and the base station controller BSC, and correspondingly between the base station controller BSC and the mobile services switching center MSC, which is a signalling connection. The reference Gn represents the connection between different support nodes of the same operator. As presented in FIG. 5, the support nodes are typically divided into gateway support nodes GGSN (Gateway GSN) and serving, i.e. home support nodes SGSN (Serving GSN). The GSM system is a time division multiple access (TDMA) system, in which communication on the radio channel is time-divided and takes place in consecutively repeated TDMA frames, each composed of several (eight) time slots. In each time slot, an information packet is transmitted in a radio frequency burst which has a finite duration and is composed of a group of modulated bits. The time slots are used primarily as control channels and communication channels. The communication channels are used for transmitting speech and data, and the control channels are used for signalling between the base station BTS and wireless communication devices MS.

The output power of the base station (BTS output power) is controlled in the following way. In blocks containing data of a PPCH channel or a PAGCH channel and data of a PBCCH or PTCCH channel, the base station uses a fixed output power, which can be lower than the output power of a BCCH channel (Broadcast Control Channel). The BCCH channel transmits general information related to the packet data transmission. According to prior art, the change in the power of the PCCCH channel in relation to the BCCH channel is indicated (Pb parameter) and transmitted on the PBCCH channel. Now that the PBCCH channel is absent, Pb is set to zero.

In other cases, power control can be used in downlink data transmission. According to the invention, mobile stations listening to the PDCH channel are informed of a change in the transmission power of the PDCH channel by means of a PR field (Power Reduction) to be established in the MAC header of the block. It must be noticed, however, that the transmission power of the base station can only be changed after transmitting data blocks, because the PR field is only defined in the RLC data block of the MAC header.

Furthermore, FIG. 3 shows in more detail the RLC data block of down-link data transmission according to GSM specification, supplemented with the PR field, which is marked with an underlining. The bit map of a RRBP field (Relative Reserved Block Period) indicates the individual uplink block which the mobile station uses to transmit a PACKET CONTROL ACKNOWLEDGEMENT block or a PACCH block to the communication network. If the RRBP field is transmitted as a part of the RLC/MAC block comprising a RLC/MAC control block, the mobile station transmits the PACKET CONTROL ACKNOWLEDGEMENT block in a given uplink data transmission block.

The PT field (Payload Type) indicates whether the RLC/MAC block in question is an RLC/MAC control block or an RLC data block. An FBI field (Final Block Indicator) indicates the last RLC block of the TBF data transmission. The TFI field functions as an identifier indicating the TBF data transmission in which the RLC data block belongs. It was stated above in this specification that the number of served mobile stations is usually less than 96. With respect to the power consumption of the mobile stations, the allocation of resources and the capacity available should rather be conducted for 1 to 3 mobile stations per PDCH channel in downlink data transmission, which leads to a maximum of 8-24 mobile stations per each carrier wave (physical radio channel). This means that as most of the mobile stations support multislot allocation, a sufficient number of TFI field values would be 32, which at the same time, however, would be sufficient with respect to efficient use of the resources on the radio channel, and on the other hand the mobile stations would receive information for the most part of the time they use for listening the radio channel. Consequently, the length of the TFI field can be reduced from the known 7 bits to 5 within the invention, since by means of a bit pattern comprising 5 bits, 32 different values can be indicated between 0 and 31. The vacant 2 bits can now be used for the PR field according to the invention. In a corresponding way, the TFI field of the RLC data block can be reduced to contain 5 bits.

Furthermore, another alternative is to use the bits of S/P (Supplementary/Polling) or RRBP fields, but with respect to the power control of downlink data transmission, there would be the drawback that changes would not be possible when using these fields to indicate polling function. FIGS. 6a-6c present other preferred embodiments of the invention for locating the PR field. Different embodiments enable 32, 64, or 128 TFI values. In the alternative presented in FIG. 6c, the fields are arranged in a manner allowing 32 different TFI values, 2 dB power level indication for downlink data transmission, and the RRBP field is omitted. Thus, acknowledgement is arranged to take place always advantageously 2 blocks after the polling function, i.e. in a fixed manner and as quickly as possible. This is reasonable for optimizing data transmission, and it would not affect the functionality of the system. In the header, it is possible to use only one bit to indicate whether the polling function is requested or not.

Advantageously, the power levels are indicated in relation to the known power level, wherein in connection with the GPRS system, a BCCH channel is used. A PBCCH carrier wave is not available all the time, but a BCCH carrier wave can be continuously monitored. Thus, a reduction in the power of the PDCH channel could be indicated in the same way as on the PBCCH channel by means of a Pb parameter. The PR field (Power Reduction) indicates a reduction in the power used to transmit the next RLC block on the PDCH channel when compared with the PBCCH channel. The reduction is indicated for example according to the following Table 1.

TABLE 1

| Bit 2 | Bit 1 | Power reduction |
|-------|-------|-----------------|
| 0 | 0 | 0-6 dB below the PBCCH level |
| 0 | 1 | 8-14 dB below the PBCCH level |
| 1 | 0 | 16-22 dB below the PBCCH level |
| 1 | 1 | 24-30 dB below the PBCCH level |

An E-bit (Extension) indicates that the RLC header also contains information which comprises an auxiliary octet (bits 1-8). A BSN field (Block Sequence Number) indicates the order of each RLC data block in each TBF data transmission in 7 bits. An M-bit (More) together with the E-bit and an LI field (Length Indicator) is used to restrict the LLC frames of the TBF data transmission. When the M-bit and the E-bit occur in the same octet, it is possible to use them together (bit pattern 00) to indicate that the mobile station has to ignore all the fields of the RLC/MAC block, except the USF field. With the present invention this is also used to indicate that PT, RRBP, and S/P fields have to be taken into account. The S/P field indicates whether the RRBP field is valid or not.

The present invention is not restricted solely to the above-presented embodiments, but it can be modified within the scope of the appended claims. The invention can also be applied for example in the UMTS system (Universal Mobile Telecommunication System).

The invention claimed is:

1. A method for controlling the operation of a mobile station (MS) in a packet switched communication network based on a cellular network, which communication network is arranged to transfer information using downlink or uplink data transmission between a base station (BTS) and at least one mobile station (MS) by means of a radio channel, comprising:

using a transmission power on a set level on the radio channel to transfer information;

transmitting information that is divided into successive blocks of the downlink data transmission from the base station (BTS) to the mobile station (MS) on the radio channel;

and wherein one of said blocks comprises data indicating power reduction in the transmission power level of said one block of the downlink data transmission or another block of the downlink data transmission to be transmitted subsequently.

2. The method according to claim 1, wherein said one block comprises the data indicating power reduction in the transmission power level of another block to be transmitted next.

3. The method according to claim 1, wherein said one block comprises the data indicating power reduction in the transmission power level of said one block.

4. The method according to claim 1, wherein an RLC block according to the GPRS system is used as said one block, and the data indicating power reduction in the transmission power level is transmitted by means of an MAC header in the RLC block.

5. The method according to claim 4, wherein the power reduction in the transmission power level is indicated by means of bits contained in an octet of said MAC header, and at least some of the bits being arranged for an TFI field (TFI) in a way known as such.

6. The method according to claim 1, wherein the power reduction in the transmission power level is indicated as a difference with respect to a known reference level.

7. The method according to claim 6, wherein said known reference level used is a BCCH channel according to the GPRS system.

8. The method of claim 1 further comprising the mobile station using the data indicating power reduction in the transmission power level to determine if a change in a received signal is caused by the base station or an environmental change.

9. The method of claim 1 further comprising using the data indicating power reduction in the transmission power level to adjust at least one parameter in the mobile station.

10. The method of claim 9 wherein the parameter is timing, frequency or amplification.

11. The method of claim 1 further comprising the mobile station using the data indicating power reduction in the transmission power level to adjust a reception level in the mobile station to a correct range.

12. The method of claim 1 further comprising adding the data indicating power reduction in the transmission power level to the block when the block is transmitted.

13. The method of claim 1 wherein the data indicating power reduction in the transmission power level is determined on a transmission end of the radio channel.

14. The method of claim 1 wherein the data indicating power reduction in the transmission power level is the power reduction in the transmission power level in use at the base station.

15. The method of claim 14 wherein the power reduction in the transmission power level is indicated as a difference with respect to a known reference level.

16. The method of claim 1 wherein the one block comprising the data and having indicated power reduction is a block transmitted from the base station, and the other block having the indicated power reduction is a block to be transmitted from the base station.

17. A communication system for implementing packet switched data transmission based on a cellular network, which communication system is arranged to transmit information using downlink or uplink data transmission between a base station (BTS) and at least one mobile station (MS) by means of a radio channel, comprising:
　means for arranging data transmission on the radio channel to take place with a transmission power on a set level, and
　means for arranging the radio channel to transmit information that is divided into successive blocks of the downlink data transmission, from the base station (BTS) to the mobile station (MS), and
　means for arranging the communication system to transmit one of said blocks containing data indicating power reduction in the transmission power level of said one block or another block to be transmitted subsequently, via a radio channel.

18. A wireless communication device, arranged to function in a communication system, which communication system is arranged to implement packet switched data transmission based on a cellular network, and which communication system is arranged to transmit information using downlink or uplink data transmission between a base station (BTS) and said wireless communication device (MS) by means of a radio channel, said wireless communication device being configured to:
　use a transmission power on a set level for data transmission on the radio channel and said wireless communication device comprising:
　means configured to receive information that is divided into successive blocks of the downlink data transmission from the base station (BTS) on the radio channel,
　said means in the wireless communication device (MS) arranged to receive one of said blocks transmitted from the base station (BTS), which one block contains data indicating power reduction in the transmission power level of said one block or another block to be transmitted subsequently.

19. The communication system of claim 17 wherein the data indicating power reduction in the transmission power level is the power reduction in the transmission power level at the transmitting end of the radio channel.

20. The communication device of claim 18, further comprising the one of said blocks including the data indicating power reduction in the transmission power level at the transmitting end of the radio channel.

21. A base station, for a communication system implementing packet switched data transmission based on a cellular network, the base station being configured to transmit information divided into successive blocks to at least one wireless communication device over a radio channel, wherein data transmission on the radio channel is configured to take place with a transmission power on a set level, and wherein the base station is further configured to transmit one of said blocks containing data indicating power reduction in the transmission power level of said one block or another block to be transmitted subsequently, via the radio channel.

22. The base station according to claim 21, wherein said power reduction in the transmission power level is indicated as a difference with respect to a known reference level.

23. A communication system for implementing packet switched data transmission based on a cellular network, comprising:
　a base station;
　at least one mobile station, wherein the system is configured to transmit information between the base station and the at least one mobile station using uplink or downlink data transmission; and
　a radio channel configured to carry the transmitted information between the base station and the at least one mobile station, wherein:
　data transmission on the radio channel is configured to take place with a transmission power on a set level,
　the radio channel is configured to transmit information that is divided into successive blocks of the downlink data transmission, from the base station to the mobile station, and
　the communication system is configured to transmit one of the blocks containing data indicating power reduction in the transmission power level of the one block or another block to be transmitted subsequently, via the radio channel.

24. The system of claim 23 wherein the data indicating power reduction in the transmission power level is the power reduction in the transmission power level at the transmitting end of the radio channel.

25. A wireless communication device for a communication system configured for packet switched data transmission in a cellular network, wherein the communication system comprises:

a base station; and a radio channel, wherein the system is configured to transmit information between the base station and the wireless communication device using downlink or uplink data transmission over the radio channel and wherein the wireless device is configured to:
- configure data transmission on the radio channel to take place with a transmission power on a set level;
- configure the radio channel to transmit information that is divided into successive blocks of the downlink data transmission, from the base station to the wireless communication device; and
- receive one of the blocks transmitted by the base station on the radio channel, which one block contains data indicating power reduction in the transmission power level of the one block or another block to be transmitted subsequently.

26. The device of claim 25 further comprising the one of the blocks indicating power reduction in the transmission power level at the transmitting end of the radio channel.

* * * * *